(12) United States Patent
Zhao et al.

(10) Patent No.: US 10,339,391 B2
(45) Date of Patent: Jul. 2, 2019

(54) FUSION-BASED WET ROAD SURFACE DETECTION

(71) Applicant: GM GLOBAL TECHNOLOGY OPERATIONS LLC, Detroit, MI (US)

(72) Inventors: Qingrong Zhao, Madison Heights, MI (US); Bakhtiar B. Litkouhi, Washington, MI (US); Qi Zhang, Sterling Heights, MI (US); Jinsong Wang, Troy, MI (US)

(73) Assignee: GM Global Technology Operations LLC., Detroit, MI (US)

( * ) Notice: Subject to any disclaimer, the term of this patent is extended or adjusted under 35 U.S.C. 154(b) by 456 days.

(21) Appl. No.: 15/245,536

(22) Filed: Aug. 24, 2016

(65) Prior Publication Data

US 2018/0060674 A1 Mar. 1, 2018

(51) Int. Cl.
  *G06K 9/00* (2006.01)
  *G06K 9/20* (2006.01)
  *G06K 9/46* (2006.01)
  *B60W 40/06* (2012.01)

(52) U.S. Cl.
  CPC ......... *G06K 9/00791* (2013.01); *B60W 40/06* (2013.01); *G06K 9/20* (2013.01); *G06K 9/4652* (2013.01); *B60W 2420/42* (2013.01); *B60W 2550/14* (2013.01); *B60W 2710/06* (2013.01);

(Continued)

(58) Field of Classification Search
  USPC ........................................................ 348/148
  See application file for complete search history.

(56) References Cited

U.S. PATENT DOCUMENTS

| 9,090,264 B1 * | 7/2015 | Zhao ..................... B60W 40/06 |
| 2011/0109448 A1 * | 5/2011 | Browne ................... B60Q 9/00 340/438 |

(Continued)

OTHER PUBLICATIONS

Katramados, Ioannis et al. "Real-Time Traversable Surface Detection by Colour Space Fusion and Temporal Analysis." ICVS '09 Proceedings of the 7th International Conference on Computer Vision Systems: Computer Vision Systems, Liège, Belgium—Oct. 13-15, 2009 , pp. 265-274. (Year: 2009).*

(Continued)

*Primary Examiner* — Behrooz M Senfi
*Assistant Examiner* — Ana Picon-Feliciano
(74) *Attorney, Agent, or Firm* — Quinn IP Law

(57) ABSTRACT

A method for determining wetness on a path of travel. A surface of the path of travel is captured by at least one image capture device. A plurality of wet surface detection techniques is applied to the at least one image. An analysis for each wet surface detection technique is determined in real-time of whether the surface of the path of travel is wet. Each analysis independently determines whether the path of travel is wet. Each analysis by each wet surface detection technique is input to a fusion and decision making module. Each analysis determined by each wet surface detection technique is weighted within the fusion and decision making module by comprehensive analysis of weather information, geology information, and vehicle motions. A wet surface detection signal is provided to a control device. The control device applies the wet surface detection signal to mitigate the wet surface condition.

23 Claims, 6 Drawing Sheets

(52) U.S. Cl.
CPC ..... *B60W 2710/18* (2013.01); *B60W 2750/40* (2013.01)

(56) References Cited

U.S. PATENT DOCUMENTS

2014/0081507 A1* 3/2014 Urmson ................ B60W 40/06
701/28
2014/0347448 A1* 11/2014 Hegemann ................ G06T 7/90
348/46
2018/0215381 A1* 8/2018 Owen ................ B60W 30/143

OTHER PUBLICATIONS

Borghys, Dirk et al. Improved object recognition by fusion of hyperspectral and SAR data, Proc. of 5th EARSeL SIG IS workshop on Imaging Spectroscopy: Innovation in environmental research, Bruges, Belgium, Apr. 23-25, 2007, pp. 1-13 . (Year: 2007).*

* cited by examiner

FUSION-BASED WET ROAD SURFACE DETECTION

BACKGROUND OF INVENTION

An embodiment relates generally to detection of water and water film thickness on a path of travel.

Precipitation on a driving surface causes several different issues for a vehicle. For example, water on a road reduces the coefficient of friction between the tires of the vehicle and the surface of the road resulting in vehicle stability issues. Detection of precipitation on a road of travel is typically determined by a host vehicle sensing for precipitation on the road utilizing some sensing operation which occurs when the precipitation is already impacting the vehicle operation such as detecting wheel slip. As a result, the vehicle must monitor its own operating conditions (e.g., wheel slip) against dry pavement operating conditions for determining whether precipitation is present. As a result, such systems may wait for such a condition to occur or may introduce excitations to the vehicle for determining whether the condition is present (e.g., generating sudden acceleration to the driven wheels for invoking wheel slip if the precipitation is present).

Moreover, individual sensing techniques typically focus on a single concept for detecting wetness of a road where each respective technique works well under certain environmental conditions (e.g., a certain level of water), but may be deficient outside of those specific environmental conditions. Therefore, it would be beneficial to have a technique that can adapt to different environmental conditions and provide reliable results.

SUMMARY OF INVENTION

An advantage of an embodiment is the detection of a wet surface of a path of travel for either alerting a driver of the wet surface condition and/or actuating a vehicle control system for mitigating the effects of the wet surface using a plurality of individual techniques where the results of the individual techniques are fused and weighted for enhancing the assessment and reliability of detecting the wet surface detection. The technique described herein cooperatively utilizes a plurality of vision-based wet surface detection techniques where each of the individual results are input to a fusion and detection module. Each of the results are weighted and the results are cooperatively fused to generate an output indicating whether the path of travel is wet or not wet. A condition assessment module determines weighting factors as a function of estimated water depth level and vehicle speed. The estimated water depth level is determined as a function of rain condition data and path of travel topology data. The weighting and fusion of the result provides an enhanced confidence level of detecting water on the path of travel than just utilizing individual techniques.

An embodiment contemplates a method for determining wetness on a path of travel. At least one image of a surface of the path of travel is captured by at least one image capture device. The at least one image capture device focusing at the surface where water is expected as a vehicle travels along the path of travel. A plurality of wet surface detection techniques is applied, by a processor, to the at least one image. A determination is made in real-time an analysis for each wet surface detection technique of whether the surface of the path of travel is wet. Each analysis independently determines whether the path of travel is wet. Each analysis by each wet surface detection technique is input to a fusion and decision making module. Each analysis determined by each wet surface detection technique is weighted within the fusion and decision making module. A wet surface detection signal is provided to a control device. The control device applies the wet surface detection signal to mitigate the wet surface condition.

DETAILED DESCRIPTION

Figure 1:
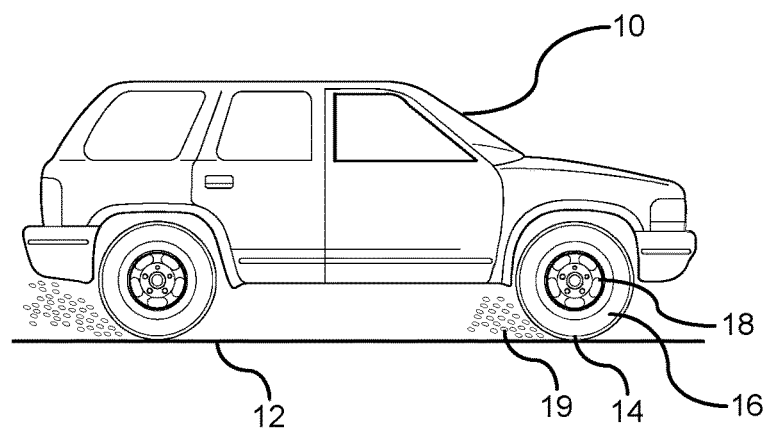
FIG. 1 an exemplary perspective view of a vehicle scene on a wet surface captured by a camera.

There is shown in FIG. 1, a vehicle 10 traveling along a vehicle road 12. Precipitation 19, in the form of water, is shown disposed on the vehicle road 12. The precipitation 19 is often displaced by the vehicle wheel 14 and tires 16 mounted on a rim 18 of the wheel 14 as the tires rotate over the wet surface on the vehicle road 12 or other path of travel. Therefore, it is advantageous to know when the vehicle will be traveling along a wet vehicle road 12 so that issues resulting from water, such as loss of traction or engine degradation resulting from water entering exterior air intake vents can be identified and negated, Identifying the water on the vehicle road 12 can assist the vehicle in determining an appropriate countermeasure for negating loss of traction and other negative effects that water can have on the vehicle. It should be understood that although an automobile is used herein for exemplary purposes, the embodiments described herein can be applied to other types of systems aside from automobiles where detection of a wet surface condition is desired. Examples of vehicles that are other than automobiles that can utilize this system include, but are not limited to, rail systems, planes, off-road sport vehicles, robotic vehicles, motorcycles, bicycles, farm equipment, and construction equipment.

Precipitation 19 on the vehicle road 12 can result in a reduction of traction when driving on the wet surface. The precipitation 19 disposed on the vehicle road 12 lowers the coefficient of friction between the vehicle tires and the vehicle road 12. As a result, traction between the vehicle tires and the vehicle road 12 is lowered. Detecting water on the road can assist the vehicle in determining the appropriate mitigation technique for minimizing any loss of traction by various mitigation techniques that include, but are not limited to, warning the driver to lower the vehicle speed to one that is conducive to the environmental conditions; actuating automatic application of the vehicle brake using a very low braking force to minimize the precipitation formed on the braking surfaces of the braking components; deactivation or restricting the activation of some advanced driver assistance features such as adaptive cruise control, lane centering, and collision avoidance while precipitation is detected; or notification to the driver to maintain a greater stopping distance to a lead vehicle.

Figure 3:
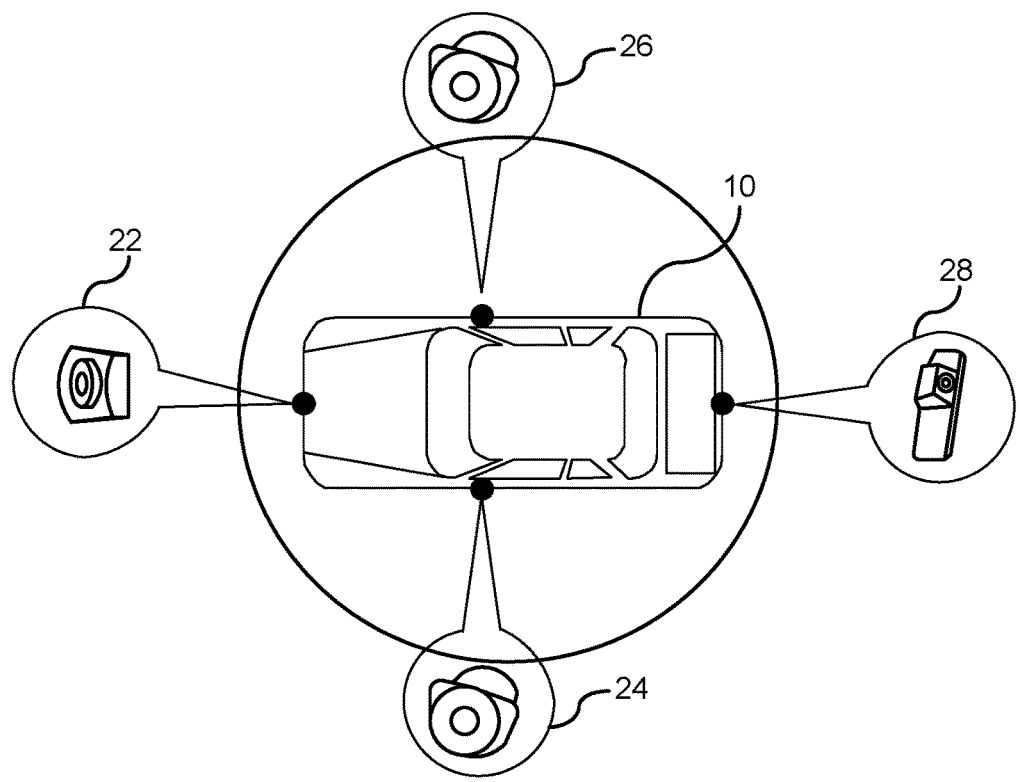
FIG. 3 is an exemplary perspective view of a vehicle surround having surround view coverage.
Figure 2:
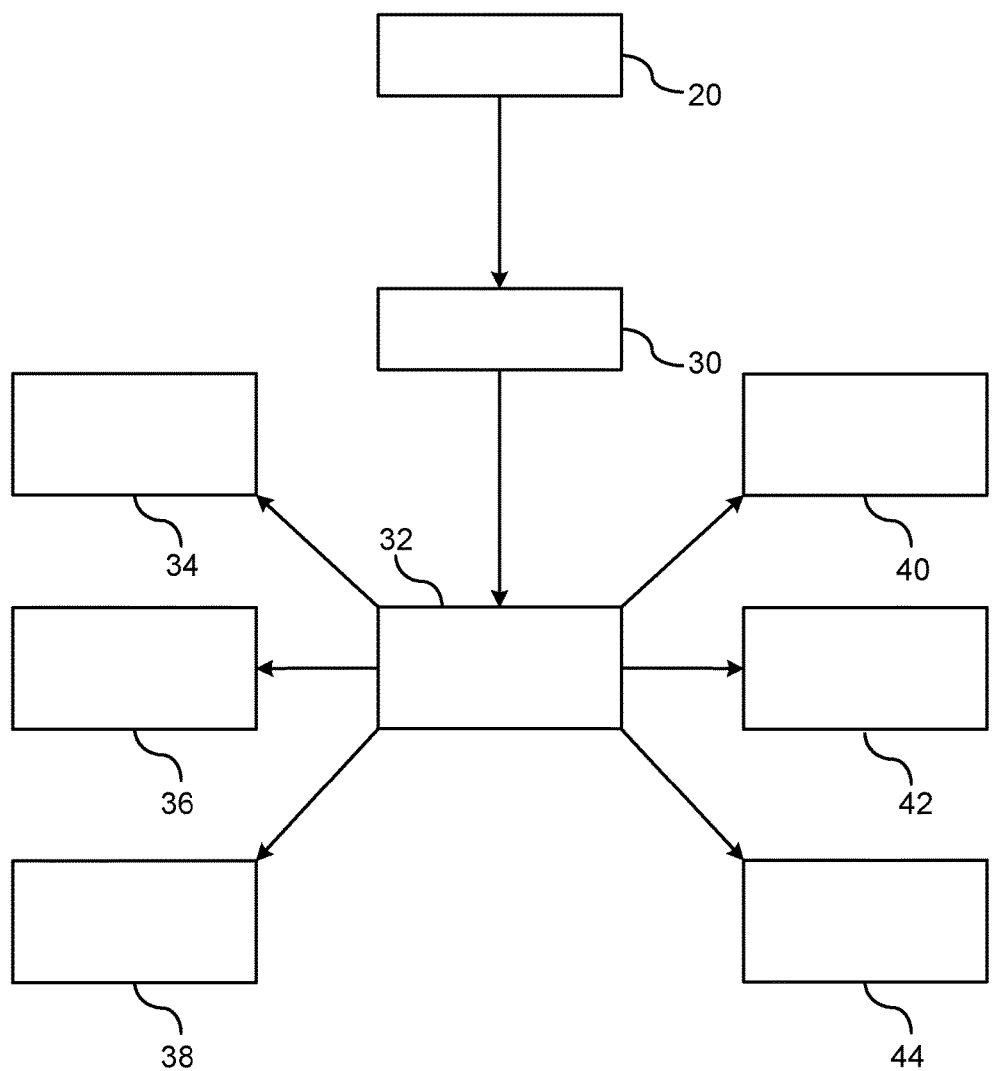
FIG. 2 illustrates a block diagram of a wet surface detection system.

FIG. 2 illustrates a block diagram of various hardware devices and systems used by the respective techniques to detect wet surfaces and to counteract wet surface conditions. A plurality of vehicle-based image capture devices 20 are mounted on the vehicle for capturing images around the vehicle. The plurality of vehicle based image capture devices 20 may be mounted on the front, rear, and sides of the vehicle. FIG. 3 illustrates an exemplary 360 degree surround view coverage for detecting objects around the vehicle. Each of the image-based capture devices are cooperatively used to detect and identify objects on each side of the vehicle. The image-based capture devices 20 include, but are not limited to, a front view camera 22 mounted to the front of the vehicle capturing image forward and partially to the sides of the vehicle, a driver's side camera 24 capturing images on the driver side of the vehicle, a passenger's side camera 26 capturing images on the passenger side of the vehicle, and a rearward facing camera 28 capturing images rearward and to the side of the vehicle.

Referring again to FIG. 2, a processor 30 processes the images captured by the image capture devices 20. The processor 30 analyzes images and data to determine whether water is present on the surface of the path of travel based on various water detection techniques. Such techniques may include a mirrored light image analysis technique, a tire rearward splash analysis technique, a tire side splash analysis technique, and a tire track analysis technique. Each of the respective techniques are described in co-pending application (Ser. No. 14/568,656) dated Dec. 12, 2014 entitled "Systems And Method For Determining A Condition Of A Road Surface"; co-pending application (Ser. No. 14/957,953) dated Dec. 3, 2015 entitled "Vision-Based Wet Road Surface Condition Detection Using Tire Rearward Splash"; co-pending application (Ser. No. 14/957,998) dated Dec. 3, 2015 entitled "Vision-Based Wet Road Surface Condition Detection Using Tire Side Splash"; and co-pending application (Ser. No. 14/957,983) dated Dec. 3, 2015 entitled "Vision-Based Wet Road Surface Condition Detection Using Tire Tracks", which are each incorporated by reference in their entirety. The results of each technique are then fused utilizing a weighting scheme to cooperatively determine whether the path of travel is a wet surface. The fusing and weight scheme provides enhanced reliability and robustness for determining whether the path of travel is wet or not.

The processor 30 may be part of an existing system, such as traction control system or other system, or can be a standalone processor dedicated to a road condition detection function, which may have inputs from different sources such as image capture devices 22, CAN bus signals (eg. vehicle speed, temperature, humidity, etc.), WiFi weather, and path of travel topology information from other modules or devices.

The processor 30 may be coupled to one or more output devices such as a controller 32 for initiating or actuating a control action based on the analysis applied by the processor. One or more countermeasures may be actuated for mitigating the effect that the water may have on the operation of the vehicle.

The controller 32 may be part of the vehicle subsystem or may be used to enable a vehicle subsystem for countering the effects of the water. For example, in response to a determination that the road is wet, the controller 32 may enable an electrical or electro-hydraulic braking system 34 or similar where a braking strategy is readied in the event that traction loss occurs. In addition to preparing a braking strategy, the braking system may autonomously apply a light braking force, without awareness to the driver, to remove water from the vehicle brakes once the vehicle enters the water. Removal of water build-up from the wheels and brakes maintains an expected coefficient of friction between the vehicle brake actuators and the braking surface of the wheels when braking by the driver is manually applied.

The controller 32 may control a traction control system 36 which distributes power individually to each respective wheel for reducing wheel slip by a respective wheel when a respective amount of water is detected on the surface of the path of travel such as in the case of hydroplaning.

The controller 32 may control an advanced driver assistance system (for example, cruise control system, adaptive cruise control system, lane following system, lane change system, evasive/assist steering maneuver system, automated emergency braking system, etc.) which can deactivate the system functionality or restrict the activation of the system when water is detected on the surface of the path of travel.

The controller 32 itself may be an advanced driver assistance system which is designed to automatically adjust its system functionality to accommodate the surface wetness by integrating wet surface signal into its controller design process and perform safely when water is detected on the surface of the path of travel.

The controller 32 may control a driver information system 40 for providing warnings to the driver of the vehicle concerning water that is detected on the vehicle road. Such a warning actuated by the controller 32 may alert the driver to the approaching water on the surface of the path of travel and may recommend that the driver lower the vehicle speed to a speed that is conducive to the current environmental conditions, or the controller 32 may actuate a warning to maintain a safe driving distance to the vehicle forward of the driven vehicle. It should be understood that the controller 32, as described herein, may include one or more controllers that control an individual function or may control a combination of functions.

The controller 32 may further control the actuation of automatically opening and closing air baffles 42 for preventing water ingestion into an engine of the vehicle. Under such conditions, the controller 32 automatically actuates the closing of the air baffles 42 when water is detected to be present on the surface of the path of travel in front of the vehicle and may re-open the air baffles when water is determined to no longer be present on the surface.

The controller 32 may further control the actuation of a wireless communication device 44 for autonomously communicating the wet pavement condition to other vehicles utilizing a vehicle-to-vehicle or vehicle-to-infrastructure communication system.

The controller may further provide the wet surface signal alerts to a driver of the vehicle against a use of advanced driver assistance systems.

Figure 4:
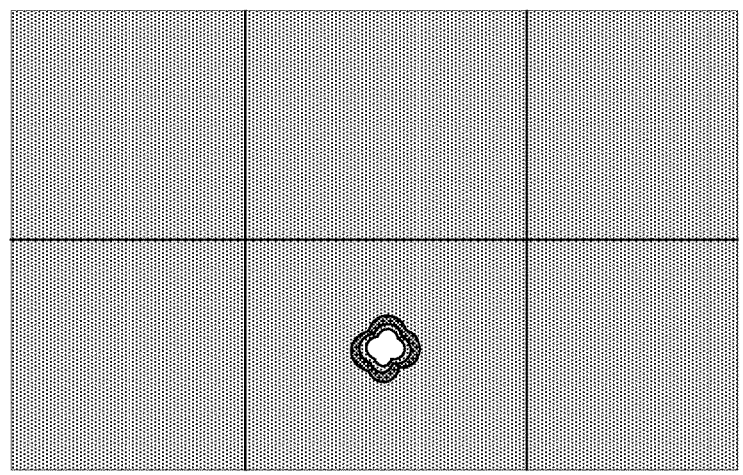
FIG. 4 illustrates an exemplary image captured of a mirrored wet surface.
Figure 5:
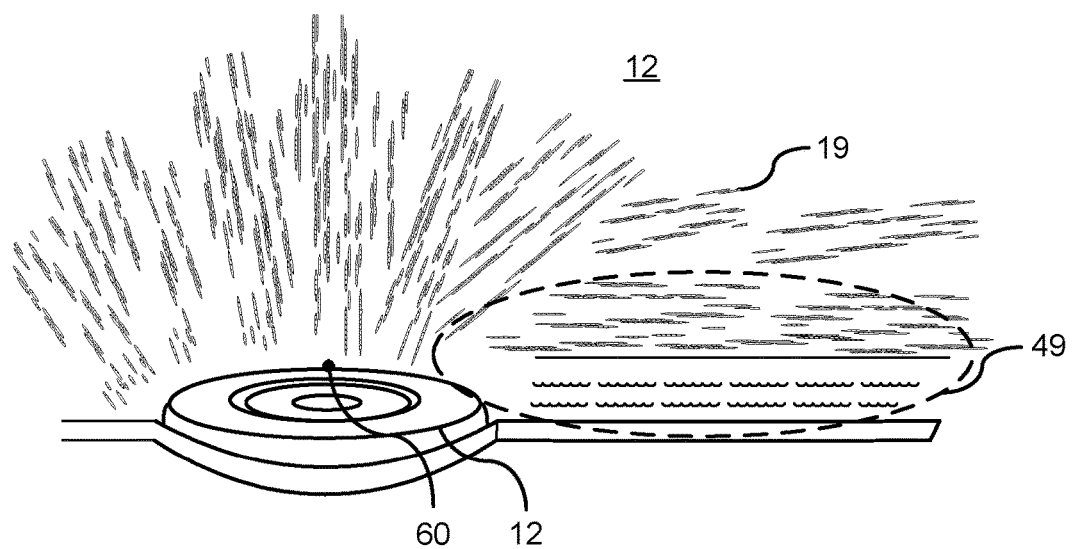
FIG. 5 illustrates an exemplary an image captured of rearward splash occurs on wet surface.
Figure 6:
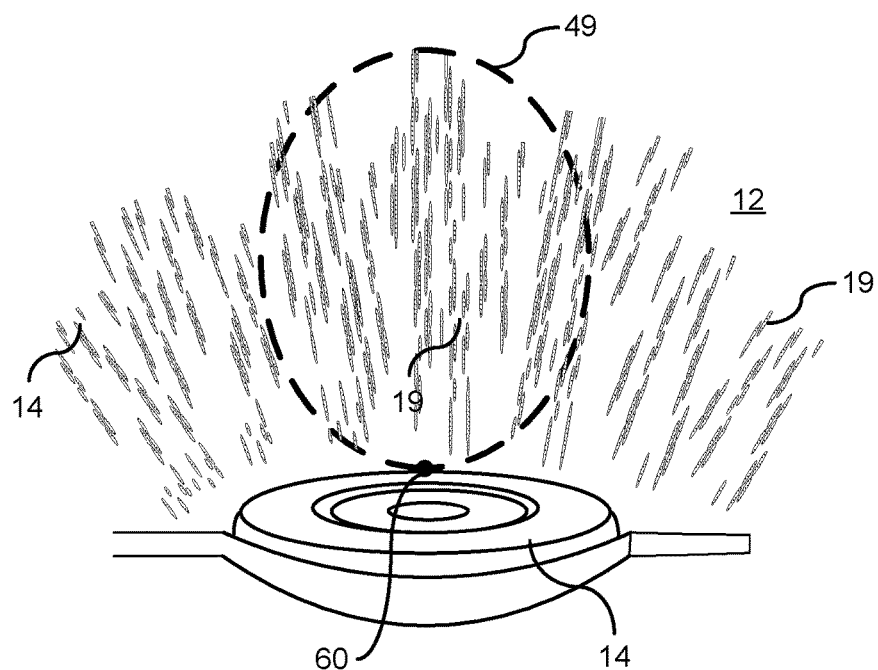
FIG. 6 illustrates an exemplary image captured of side tire splash on wet surface.
Figure 7:
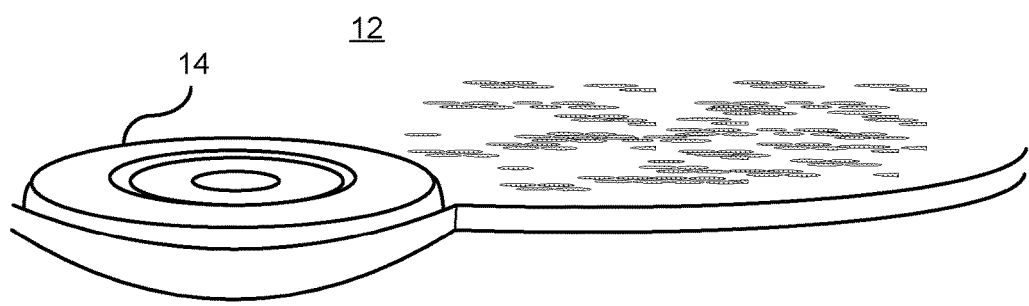
FIG. 7 illustrates an image when tire tracks are generated on a wet surface.

The various techniques described above each provide a novel approach as to determining wet surface. Each of the following figures represents exemplary images where the respective techniques are capable of detecting water on the surface based on the disbursement of water or reflection of light in the image. For example, FIG. 4 illustrates an image captured of a mirrored surface where ice or a wet road is detected by the mirrored light image analysis technique. FIG. 5 illustrates an image captured when a rearward splash occurs that is detected by the rearward splash analysis technique. FIG. 6 illustrates an image captured when a side tire splash occurs that is detected by the side splash analysis technique. FIG. 7 illustrates an image when tire tracks are generated on a wet surface that is detected by the tire track analysis technique. Each of the techniques described earlier is proficient at identifying water on the path of travel when water displacement or non-displacement is present under certain conditions. Therefore, the following technique describes a process to use each of the techniques cooperatively for enhancing reliability in detecting a wet vs non-wet surface.

Figure 8:
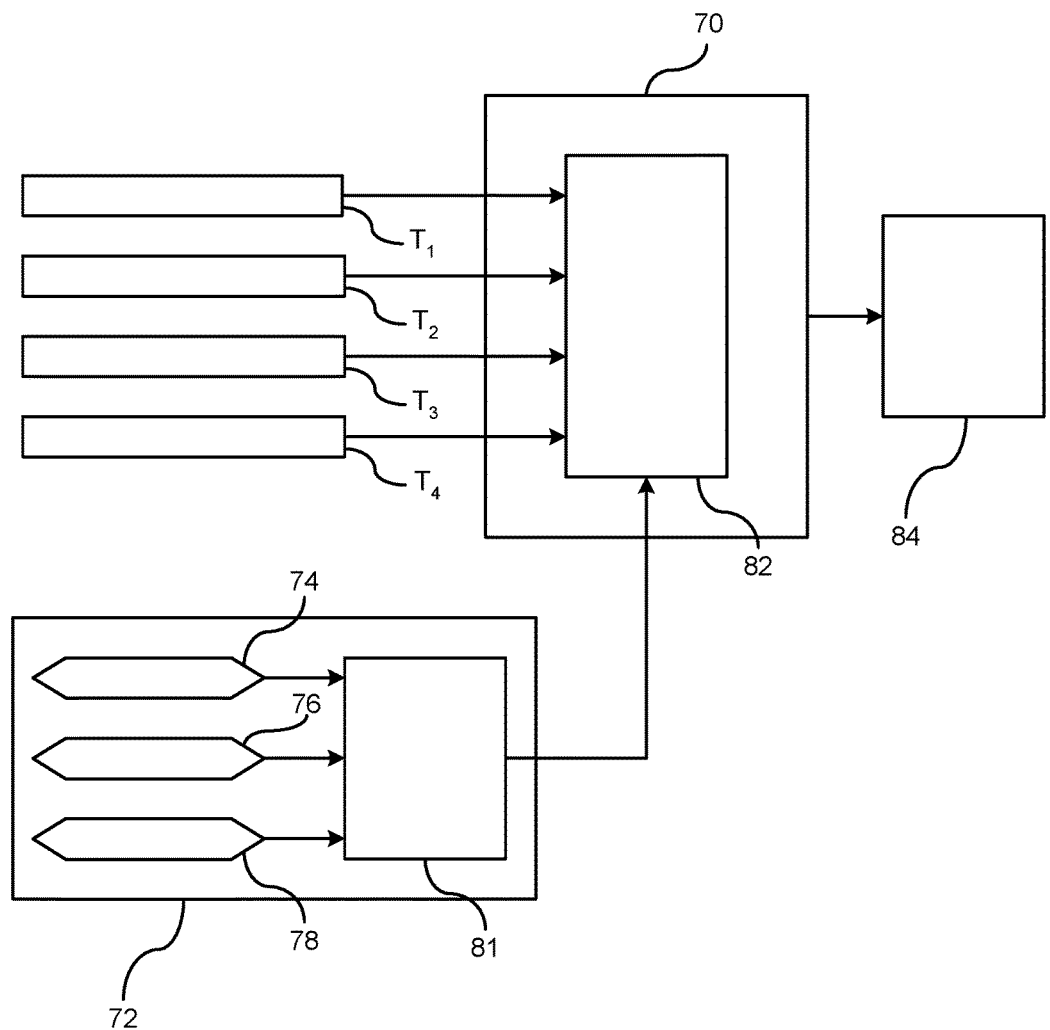
FIG. 8 illustrates a block diagram of the proposed wet surface detection technique based on fusion and weighting scheme

FIG. 8 illustrates a block diagram of the wet road condition based on weighting scheme. Analysis of a road surface is applied by each of the respective techniques described earlier such as mirrored light image analysis $T_1$, tire rearward splash analysis $T_2$, tire side splash analysis $T_3$, tire track analysis $T_4$. Each of the respective techniques outputs a wet signal (e.g., 1) or a non-wet signal (e.g., 0). Each output signal determined by each technique is input to a fusion in decision-making module 70.

The fusion and decision-making module 70 utilize each of the respective techniques for generating a final decision related to surface condition of the path of travel. However, each of the respective inputs to the fusion decision-making module 70 may not be equally weighted. That is, a technique is applied for allocating a weight to each respective input that is dynamically determined based on assessments from a condition assessment module 72.

The condition assessment module 72 utilizes a plurality of environmental conditions, geology conditions, and vehicle operating conditions for determining weighting factors that are applied to each of the respective inputs within the fusion decision-making module 70.

The environmental condition includes rain condition information 74. Such data may include, but is not limited to, rain status (e.g., rain or no-rain), strength of rain (e.g., light, medium, heavy), rain duration, elapsed time since rain stopped, amount of rain. Such information may be obtained from various sources that include, but are not limited to, Real Time WiFi, weather Apps, cloud information.

The geology conditions include road topology 76. Such data may include, but is not limited to, road type (e.g., flat/slope/low-lying area), road elevation, and road grade. Such information may be obtained from various sources that include, but are not limited to, a 3-dimensional maps, GPS, and road grade estimation algorithms.

The vehicle operating conditions may include, but is not limited to, vehicle longitudinal speed 78. Such information may be obtained from various sources that include, but are not limited to, vehicle messages communicated through the vehicle CAN (obtained from speed sensors, wheel sensors, vehicle engine sensors, and other powertrain components), and GPS devices.

Figure 9:
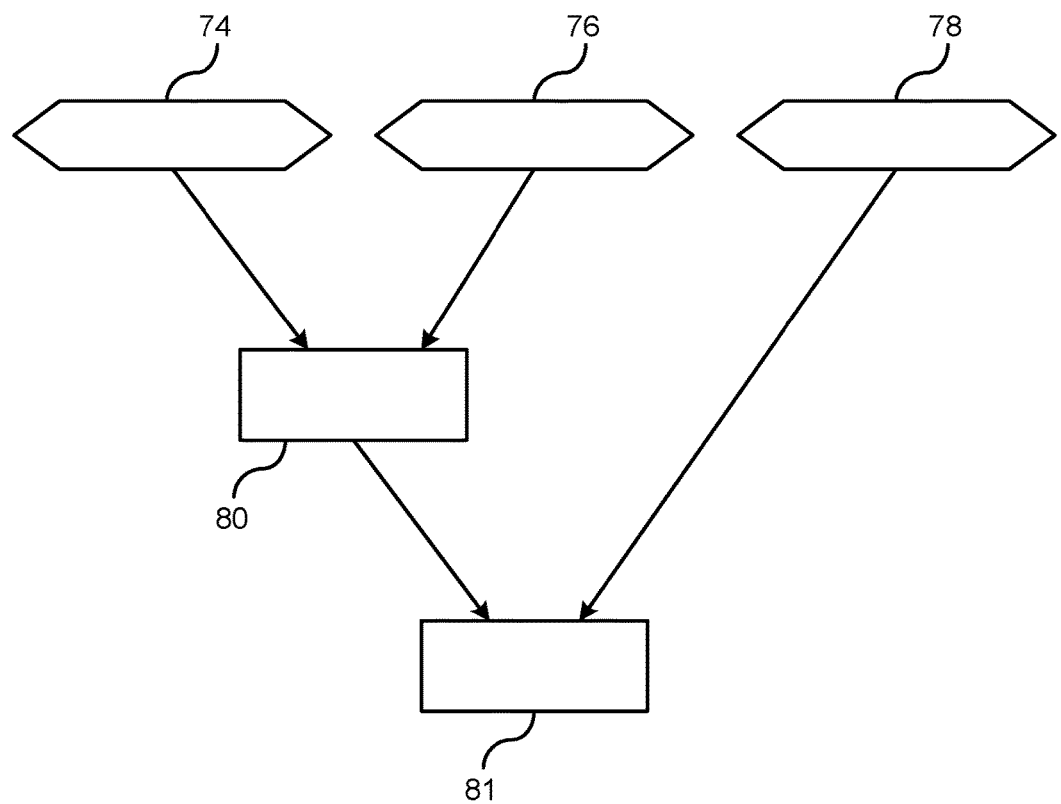
FIG. 9 illustrates a flow diagram for determining weighting factors within the condition assessment model.

FIG. 9 illustrates a flow diagram for determining weights of each individual detection technique within the condition assessment model 70. Rain condition information 74 and path of travel topology information 76 are two important factors that influence the water depth on a path of travel. So rain condition information and path of travel topology information are evaluated and cooperatively used to estimate the water depth level on the surface of the path of travel. The water depth may be categorized into various levels such as minimum, shallow, medium, and deep. For example, a water thickness <0.5 mm is categorized as a minimum level, a water thickness between 0.5 mm-1.0 mm is categorized as a shallow level; a water thickness between 1.0 mm-2.5 is categorized as a medium level; and water thickness >2.5 mm is categorized as a deep level. It should be understood that the various classification levels and their associated water depth levels are exemplary and various classification and water depth level ranges may be utilized. The water depth level on the path of travel can be estimated using a machine learning classifier including, but not limited to, a Neural network classifier or a Bayesian network classifier. The network weights can be trained in advance using input training data of rain information and road topology information. Alternatively, logic deduction based on empirical data may be used to estimate the water depth level on the surface of the path of travel. After the estimated water depth level 80 on the path of travel is estimated, the estimated water depth level and the speed of the vehicle are then cooperatively utilized to determine a weight factor for each respective technique within a weight calculation module 81. A weight factor of each respective technique indicates a confidence level for the detection performance of that particular technique under current environmental conditions. For example estimated water depth levels (D) may be represented by the following expression:

$$D=\{d1=\text{minimal}, d2=\text{shallow}, d3=\text{medium}, d4=\text{deep}\}.$$

The vehicle speed level (V) may be represented by the following expression:

$$V=\{v1=\text{low}, v2=\text{medium}, v3=\text{high}\}.$$

The respective techniques mirrored light image technique, tire rearward splash technique, tire side splash technique, and tire track technique each may be represented by $\{T1, T2, T3, T4\}$ respectively. As a result, weight factors may be determined for each respective technique as follows:

$$W=\{w1 (\text{for } T1), w2 (\text{for } T2), w3 (\text{for } T3), w4 (\text{for } T4)\}.$$

Therefore, the weighting factors can be calculated as a conditional probability for each respective technique $T_i$ when the estimated water depth level D and vehicle speed V are known. The representation is as follows:

$$W=P(T_i|D,V)$$

where P is a conditional probability, $T_i$ is a respective technique (e.g., $\{T1, T2, T3, T4\}$), D is the water depth level that can take on a respective value {shallow, medium, deep}, and V is the velocity of the vehicle that can take on a respective value {low, medium, high}. As a result, a determination is made whether the path of travel is either wet (e.g., 1) or not wet (e.g., 0). If the determination is made that the path of travel is wet, then the respective signal is provided to a warning/control application module 84 to either alert the driver of the wetness on the path of travel or the vehicle may utilize this information to enable or disable vehicle operations or vehicle stability operations.

The following table illustrates exemplary weighting factors assigned for each technique based on empirical data. A confidence level is determined for each technique.

| D | V | T1 | T2 | T3 | T4 |
|---|---|---|---|---|---|
| shallow | low | 90% | 9% | 0.5% | 0.5% |
| shallow | medium | 70% | 29% | 0.5% | 0.5% |
| shallow | high | 50% | 48% | 1% | 1% |
| medium | low | 48% | 48% | 1% | 1% |
| medium | medium | 30% | 60% | 5% | 5% |
| medium | high | 5% | 85% | 5% | 5% |
| deep | low | 1% | 30% | 40% | 50% |
| deep | medium | 0.1% | 29.5% | 35% | 35% |
| deep | high | 0.1% | 19.5% | 40% | 40% |

As illustrated in this exemplary table, when the water is shallow and speed is low, technique T1 works best as indicated by the confidence level. As the water depth increases and speed increases, the technique T2 works best. As the water depth is determined to be deep, then techniques T3 and T4 work best. Based on this empirical sensing data, a probability can be obtained using the weighting factor determined for each technique derived by $P(T_i|D,V)$.

In response to determining a weight for each technique, voting by a weighted voting module 82 can be determined as follows:

Voting number=$w1*T1+w2*T2+w3*T3+w4*T4$ where $T_i$ (i=1, 2, 3, 4) takes on either 1 (wet) or 0 (non-wet). Rules may be made such that if the voting number is larger than a predetermined threshold (e.g., 50%), then the determination is made that the surface is wet; otherwise, the surface is non-wet.

The warning/control application module 84 may be an output device where the warning to the driver may be a visual, audible, or haptic output to notify the user of the wet surface condition on the path of travel. Moreover, the warning/control application module may be control device that utilizes the information to actuate vehicle controls to counteract the wetness on the path of travel.

While certain embodiments of the present invention have been described in detail, those familiar with the art to which this invention relates, will recognize various alternative designs, filtering processes and embodiments for practicing the invention as defined by the following claims.

What is claimed is:

1. A method for determining wetness on a path of travel of a motor vehicle, the method comprising:
    capturing an image of a surface of the path of travel by an image capture device, the image capture device focusing at the surface where water is expected as the motor vehicle travels along the path of travel;
    applying a plurality of wet surface detection techniques, by a processor, to the image, each of the wet surface detection techniques independently assessing whether the path of travel is wet or not wet, the plurality of wet surface detection techniques including a rearward tire splash analysis technique, a side tire splash analysis technique, a tire track analysis technique, and/or a mirrored light image analysis technique;
    determining, in real-time by the processor, a respective analysis result for each of the wet surface detection techniques indicating the surface of the path of travel is wet or not wet;
    inputting the analysis results determined by the wet surface detection techniques into a fusion and decision-making module;
    weighting the analysis results input into the fusion and decision-making module using a condition assessment module, the weighting including dynamically determining and applying a respective weight factor to each of the analysis results determined by each of the wet surface detection techniques within the fusion and decision-making module;
    fusing the weighted analysis results using the fusion and decision-making module, the fusing including calculating a summation of the weighted analysis results and determining if the summation of the weighted analysis results exceeds a predetermined threshold; and
    providing, responsive to the summation of the weighted analysis results exceeding the predetermined threshold, a wet surface detection signal indicating a wet surface condition on the path of travel to a control device of the motor vehicle, the control device applying the wet surface detection signal to mitigate the wet surface condition.

2. The method of claim 1, wherein the rearward tire splash analysis technique includes detecting within the captured image a rearward tire splash of water off of the path of travel.

3. The method of claim 1, wherein the side tire splash analysis technique includes detecting within the captured image a side tire splash of water off of the path of travel.

4. The method of claim 1, wherein the tire track analysis technique includes detecting within the captured image a tire track generated by a tire of the motor vehicle on the path of travel when the surface is wet.

5. The method of claim 1, wherein the mirrored light image analysis technique includes detecting within the captured image a mirrored surface where ice or water is present on the path of travel.

6. The method of claim 1, wherein each of the analysis results determined by each of the wet surface detection techniques is normalized to represent one of a wet surface or a non-wet surface.

7. The method of claim 1, wherein each of the weigh factors is determined as a function of rain condition data, path of travel topology data, and vehicle speed data.

8. The method of claim 7, wherein the weighting as determined by the condition assessment module includes determining a water depth level on the path of travel as a function of the rain condition data and the road topology data.

9. The method of claim 8, wherein the weighting as determined by the condition assessment module includes determining the respective weight factor for each of the respective wet surface detection techniques as a function of the water depth level on the path of travel and the vehicle speed.

10. The method of claim 8, wherein the condition assessment module utilizes a Neural Network to determine the water depth level on the path of travel and the weight factors.

11. The method of claim 8, wherein the condition assessment module utilizes a Bayesian Network to determine the water depth level on the path of travel and the weight factors.

12. The method of claim 8, wherein the condition assessment module utilizes logic deduction to determine the water depth level on the path of travel.

13. The method of claim 9, wherein the respective weight factors are dynamically determined by the following equation:

$$W=P(T_i|D,V)$$

where W is a weight factor, P is a conditional probability, $T_i$ is a respective wet road surface detection technique, D is the water depth level, and V is the velocity of the vehicle.

14. The method of claim 13, wherein fusing the weighted analysis results using the fusion and decision-making module includes calculating a voting number as follows:

Voting number=$w1*T1+w2*T2+w3*T3+w4*T4$ where $T_i$ (I=1, 2, 3, 4) is the respective analysis results for one of the wet surface detection techniques and takes on either 1 (wet) or 0 (non-wet); and $w_i$ (I=1, 2, 3, 4) is the respective weight factor for one of the respective analysis results and takes on a corresponding percentage value.

15. The method of claim 1, wherein the control device uses the wet surface detection signal to determine a vehicle braking strategy to autonomously actuate a braking system of the motor vehicle.

16. The method of claim 1, wherein the control device uses the wet surface detection signal to determine a traction control strategy to autonomously actuate a traction control system of the motor vehicle.

17. The method of claim 1, further comprising transmitting the wet surface detection signal to a wireless communication system to alert other vehicles of the wet surface condition on the path of travel.

18. The method of claim 1, wherein the control device uses the wet surface detection signal to alert a driver of the motor vehicle of a potential reduced traction between vehicle tires of the motor vehicle and the surface as a result of the identified wet surface condition on the path of travel.

19. The method of claim 1, wherein the control device uses the wet surface detection signal to alert a driver of the motor vehicle against a use of a driver assistance system of the motor vehicle.

20. The method of claim 1, wherein the control device uses the wet surface detection signal to autonomously modify a control setting of an automated control feature of the motor vehicle in response to the identified wet surface condition on the path of travel.

21. The method of claim 1, wherein the control device uses the wet surface detection signal to alert a driver of the motor vehicle to reduce a vehicle speed of the motor vehicle in response to the identified wet surface condition on the path of travel.

22. The method of claim 1, wherein the control device uses the wet surface detection signal to shut baffles on an air intake scoop of the motor vehicle for preventing water ingestion in response to the identified wet surface condition on the path of travel.

23. A motor vehicle comprising:
a vehicle body;
a plurality of wheels rotatably mounted to the vehicle body;
an image capture device mounted to the vehicle body; and
a processor mounted to the vehicle body and communicatively connected to the image capture device, the processor being programmed to:
  capture, via the image capture device, an image of a surface of a path of travel of the motor vehicle;
  apply to the captured image a plurality of wet surface detection techniques each operable to independently assess whether the surface of the path of travel is wet or not wet, the wet surface detection techniques including at least two of a rearward tire splash analysis technique, a side tire splash analysis technique, a tire track analysis technique, or a mirrored light image analysis technique;
  determine, in real-time for each of the applied wet surface detection techniques, a respective analysis result indicating the surface is wet or not wet;
  input the determined analysis results of the wet surface detection techniques into a fusion and decision-making module;
  weight, via a condition assessment module, the analysis results of the wet surface detection techniques, including dynamically determining and applying a respective weight factor to each of the analysis results;
  fuse, via the fusion and decision-making module, the weighted analysis results, including calculating a summation of the weighted analysis results and determining if the summation of the weighted analysis results exceeds a predetermined threshold; and
  responsive to the summation of the weighted analysis results exceeding the predetermined threshold, commanding a control device of the motor vehicle to mitigate a wet surface condition on the surface of the path of travel based on a wet surface detection signal indicative of the wet surface condition.

* * * * *